(12) United States Patent
Nakasaka

(10) Patent No.: US 9,903,293 B2
(45) Date of Patent: Feb. 27, 2018

(54) DIAGNOSTIC SYSTEM FOR INTERNAL COMBUSTION ENGINE

(71) Applicant: TOYOTA JIDOSHA KABUSHIKI KAISHA, Toyota-shi, Aichi-ken (JP)

(72) Inventor: Yukihiro Nakasaka, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 93 days.

(21) Appl. No.: 15/103,058

(22) PCT Filed: Dec. 9, 2014

(86) PCT No.: PCT/IB2014/002700
§ 371 (c)(1),
(2) Date: Jun. 9, 2016

(87) PCT Pub. No.: WO2015/087134
PCT Pub. Date: Jun. 18, 2015

(65) Prior Publication Data
US 2016/0312727 A1 Oct. 27, 2016

(30) Foreign Application Priority Data
Dec. 11, 2013 (JP) .................................. 2013-255896

(51) Int. Cl.
*G01M 15/04* (2006.01)
*F02D 41/14* (2006.01)
(Continued)

(52) U.S. Cl.
CPC ....... *F02D 41/1495* (2013.01); *F02D 35/023* (2013.01); *F02D 41/0085* (2013.01); *F02D 41/1443* (2013.01); *G01M 15/08* (2013.01)

(58) Field of Classification Search
USPC .................................................... 73/114.16
See application file for complete search history.

(56) References Cited

U.S. PATENT DOCUMENTS

2008/0183364 A1* 7/2008 Ellmer ................ F02B 77/085
701/103
2010/0004845 A1* 1/2010 Tunestal ............... G01M 15/09
701/102
(Continued)

FOREIGN PATENT DOCUMENTS

JP H03-23349 A 1/1991
JP 2005-133604 A 5/2005
(Continued)

*Primary Examiner* — Eric S McCall
(74) *Attorney, Agent, or Firm* — Andrews Kurth Kenyon LLP

(57) ABSTRACT

A diagnostic system for an internal combustion engine includes an in-cylinder pressure sensor and an ECU. The ECU is configured to: (a) determine whether each cylinder of the evaluation target cylinder group is a lean cylinder; (b) estimate a degree of leanness of the air-fuel ratio of the present lean cylinders when the lean cylinders are present in the evaluation target cylinder group; (c) calculate a polytropic index in an expansion stroke for each cylinder; (d) correlate relationship information for defining a relationship between the polytropic index in the expansion stroke and an air-fuel ratio index value with the polytropic index in the expansion stroke of a reference lean cylinder; and (e) calculate the difference in air-fuel ratio between cylinders on the basis of the polytropic index of the reference lean cylinder, the relationship information correlated with the polytropic index of the reference lean cylinder.

9 Claims, 10 Drawing Sheets

(51) Int. Cl.
 *F02D 41/00* (2006.01)
 *F02D 35/02* (2006.01)
 *G01M 15/08* (2006.01)

(56) References Cited

U.S. PATENT DOCUMENTS

| 2016/0169140 A1* | 6/2016 | Yeager | F02D 37/02 |
| | | | 701/103 |
| 2017/0009688 A1* | 1/2017 | Okunishi | F02D 41/1486 |
| 2017/0016872 A1* | 1/2017 | Nakasaka | F02D 41/0085 |

FOREIGN PATENT DOCUMENTS

| JP | 2009-174401 A | 8/2009 |
| JP | 2010-133353 A | 6/2010 |
| JP | 2012-180817 A | 9/2012 |
| JP | 2013-142302 A | 7/2013 |

* cited by examiner

FIG. 6
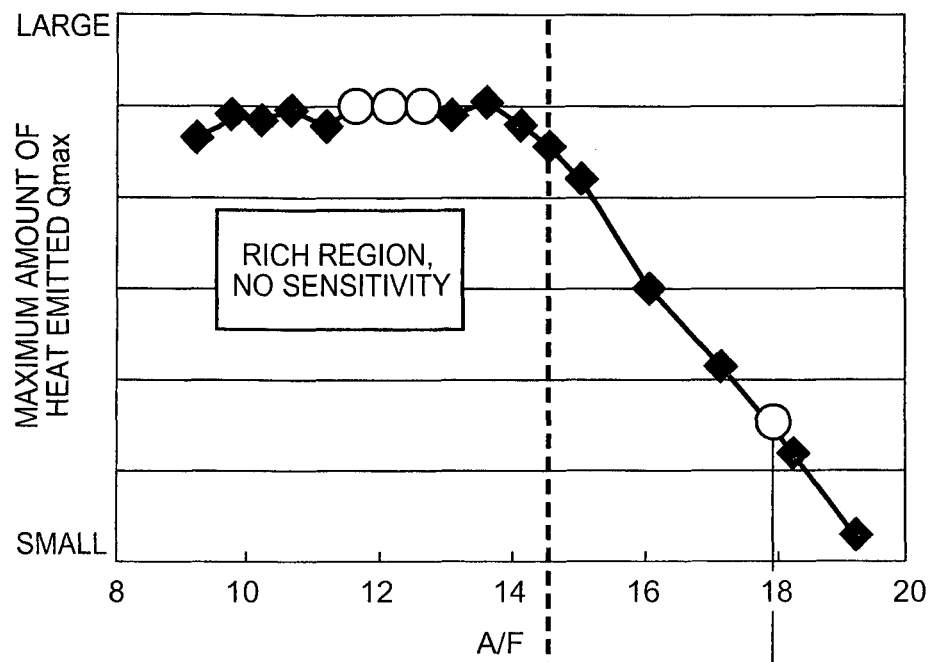
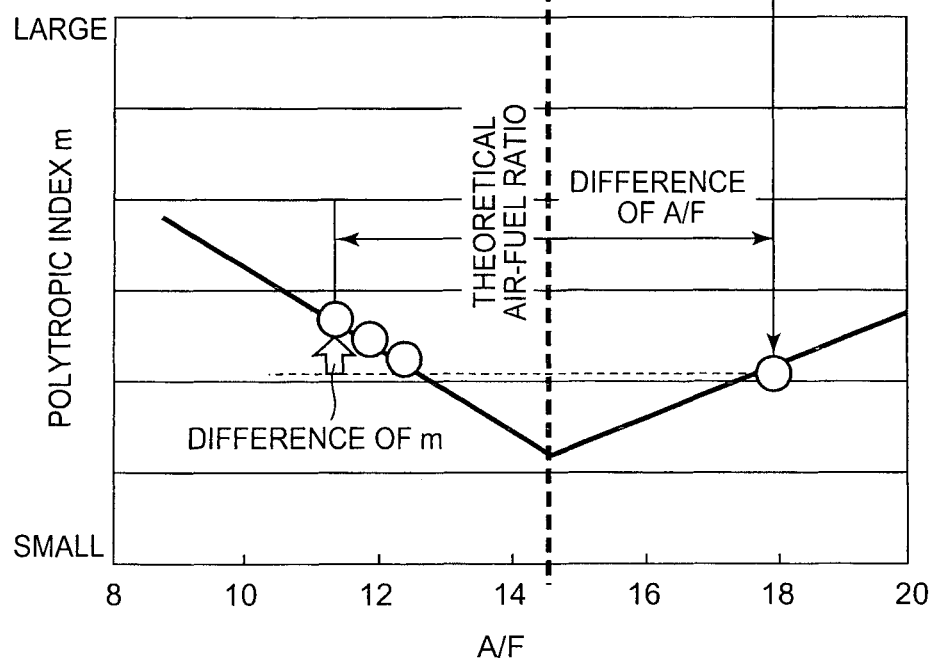

FIG. 9
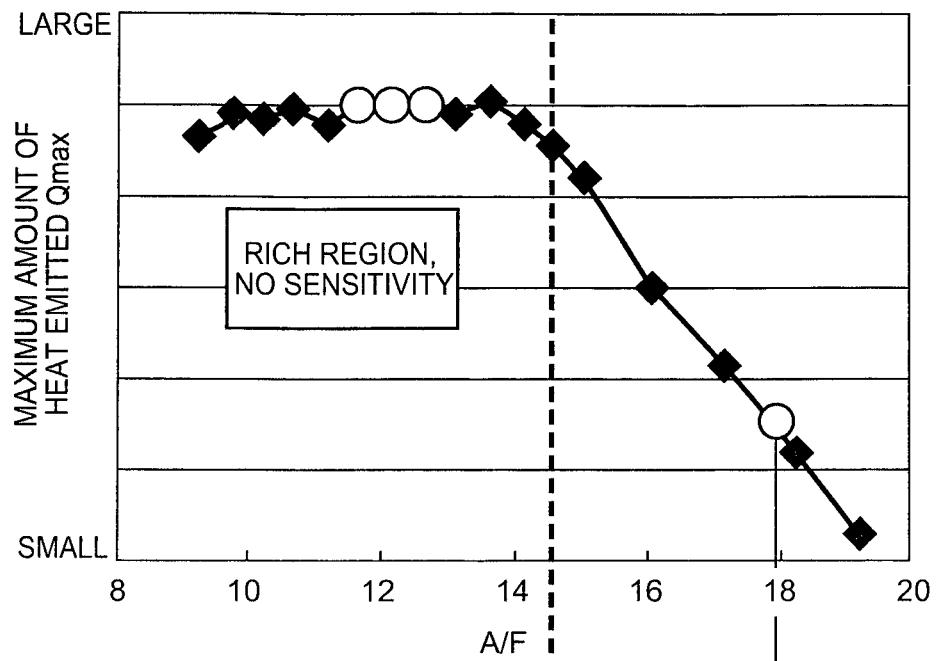
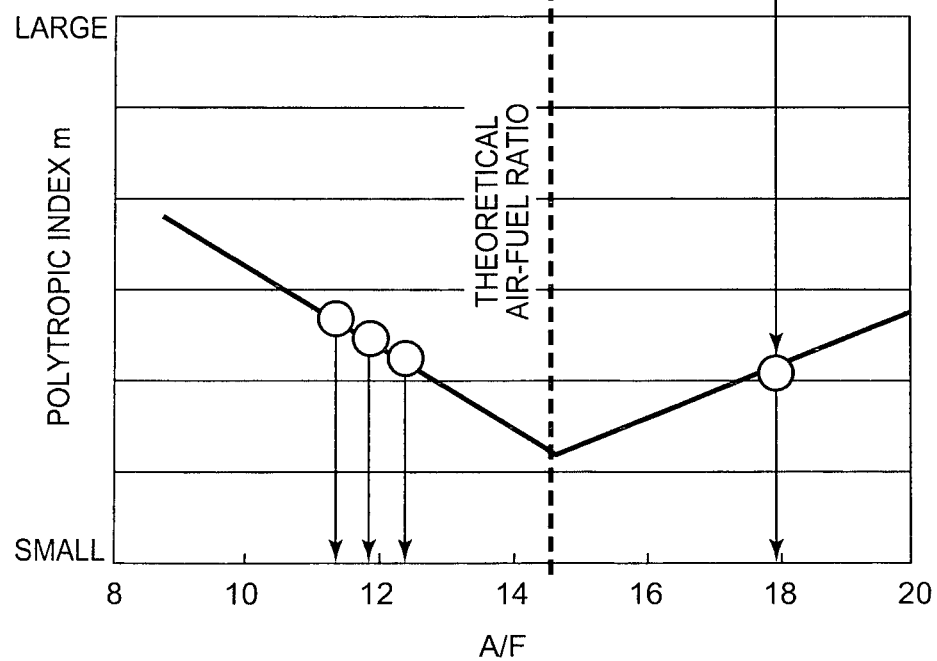

DIAGNOSTIC SYSTEM FOR INTERNAL COMBUSTION ENGINE

CROSS-REFERENCE TO RELATED APPLICATIONS

This is a national phase application based on the PCT International Patent Application No. PCT/I62014/002700 filed Dec. 9, 2014, claiming priority to Japanese Patent Application No. 2013-255896 filed Dec. 11, 2013, the entire contents of both of which are incorporated herein by reference.

BACKGROUND OF THE INVENTION

1. Field of the Invention

The present invention relates to a diagnostic system for an internal combustion engine, and more particularly, to a diagnostic system for an internal combustion engine which is suitable for a device detecting an air-fuel ratio imbalance between cylinders or detecting an air-fuel ratio of a cylinder in a multi-cylinder internal combustion engine.

2. Description of Related Art

In recent years, Japanese Patent Application Publication No. 2013-142302 (JP 2013-142302 A) discloses a diagnostic system for an internal combustion engine that detects an air-fuel ratio or an air-fuel ratio imbalance between cylinders using an in-cylinder pressure sensor. In the diagnostic system according to the related art, an amount of fuel injected of a target cylinder is changed so that a combustion rate reaches a peak value. Information on the air-fuel ratio of the target cylinder is calculated on the basis of the change in the amount of fuel injected from the change start of the amount of fuel injected to the reaching of the peak value of the combustion rate.

SUMMARY OF THE INVENTION

For example, an amount of heat emitted or a combustion rate in a cylinder due to combustion can be calculated as a combustion parameter correlated with the air-fuel ratio of gas in a cylinder using an output value of an in-cylinder pressure sensor. Both the amount of heat emitted and the combustion rate have high sensitivity to the air-fuel ratio in a region in which the air-fuel ratio is higher than a theoretical air-fuel ratio. However, in a region in which the air-fuel ratio is lower than the theoretical air-fuel ratio, the sensitivity of the amount of heat emitted or the combustion rate to the air-fuel ratio is low, it is difficult to accurately specify the air-fuel ratio from the amount of heat emitted or the combustion rate, and it is difficult to acquire information of the air-fuel ratio at such a level which is used to detect an air-fuel ratio imbalance between cylinders.

The invention provides a diagnostic system for an internal combustion engine that can calculate a difference in air-fuel ratio between cylinders or calculate an air-fuel ratio index value using an in-cylinder pressure sensor even in a region in which the air-fuel ratio is lower than a theoretical air-fuel ratio.

According to a first aspect of the invention, there is provided a diagnostic system for an internal combustion engine, the internal combustion engine including plural cylinders, the diagnostic system being configured to evaluate a difference in air-fuel ratio between cylinders in an evaluation target cylinder group including at least some cylinders of the plural cylinders. The diagnostic system includes in-cylinder pressure sensors and an electronic control unit (ECU). The in-cylinder pressure sensors are configured to detect an in-cylinder pressure in each cylinder of the evaluation target cylinder group. The ECU is configured to: (a) determine whether each cylinder of the evaluation target cylinder group is a rich cylinder in which an air-fuel ratio is lower than a theoretical air-fuel ratio or a lean cylinder in which the air-fuel ratio is higher than the theoretical air-fuel ratio; (b) estimate a degree of leanness of the air-fuel ratio with respect to the theoretical air-fuel ratio in at least one cylinder out of the present lean cylinders when the lean cylinders are present in the evaluation target cylinder group; (c) calculate a polytropic index in an expansion stroke for each cylinder of the evaluation target cylinder group on the basis of the in-cylinder pressure detected by the in-cylinder pressure sensors; (d) correlate relationship information for defining a relationship between the polytropic index in the expansion stroke and an air-fuel ratio index value with the polytropic index in the expansion stroke of a reference lean cylinder that is the lean cylinder of which the degree of leanness of the air-fuel ratio is estimated on the basis of the polytropic index in the expansion stroke and the degree of leanness of the reference lean cylinder; and (e) calculate the difference in air-fuel ratio between cylinders on the basis of the polytropic index in the expansion stroke of the reference lean cylinder, the relationship information correlated with the polytropic index in the expansion stroke of the reference lean cylinder, and the polytropic index in the expansion stroke of the cylinder other than the reference lean cylinder in the evaluation target cylinder group.

According to the first aspect, it is determined whether each cylinder of the evaluation target cylinder group is a rich cylinder or a lean cylinder and the polytropic index in the expansion stroke is calculated using the in-cylinder pressure sensor. When a lean cylinder is present, the reference lean cylinder is set in which the degree of leanness of the air-fuel ratio with respect to the theoretical air-fuel ratio is estimated. There is a correlation between the polytropic index in the expansion stroke and the air-fuel ratio index value. According to the invention, the relationship information for defining the correlation is correlated with the polytropic index in the expansion stroke of the reference lean cylinder on the basis of the polytropic index in the expansion stroke and the degree of leanness of the reference lean cylinder. Accordingly, it is possible to calculate the difference in air-fuel ratio between cylinders so as to include rich cylinders on the basis of the polytropic index in the expansion stroke of the reference lean cylinder, the relationship information correlated as described above, and the polytropic index in the expansion stroke of a cylinder other than the reference lean cylinder in the evaluation target cylinder group. In this aspect, the ECU may be configured to calculate an amount of heat emitted or a combustion rate in the reference lean cylinder using the in-cylinder pressure detected by the in-cylinder pressure sensor and to estimate that the degree of leanness of the air-fuel ratio of the reference lean cylinder is higher as the calculated amount of heat emitted becomes smaller or the calculated combustion rate becomes lower. In this case, it is possible to accurately estimate the degree of leanness of the air-fuel ratio of the reference lean cylinder using the in-cylinder pressure detected by the in-cylinder pressure sensor.

According to a second aspect of the invention, there is provided a diagnostic system for an internal combustion engine, the internal combustion engine including plural cylinders, the diagnostic system being configured to evaluate a difference in air-fuel ratio between cylinders in an evaluation target cylinder group including at least some cylinders of the plurality of cylinders. The diagnostic system includes an in-cylinder pressure sensors and an electronic control unit (ECU). The in-cylinder pressure sensors are configured to detect an in-cylinder pressure in each of the cylinders in the evaluation target cylinder group. The ECU is configured to: (f) determine whether each cylinder of the evaluation target cylinder group is a rich cylinder in which an air-fuel ratio is lower than a theoretical air-fuel ratio; (g) calculate a polytropic index in an expansion stroke for each cylinder of the evaluation target cylinder group on the basis of the in-cylinder pressure detected by the in-cylinder pressure sensors; and (h) calculate the difference in air-fuel ratio between cylinders on the basis of the polytropic index in the expansion stroke of each cylinder of the evaluation target cylinder group when all the cylinders of the evaluation target cylinder group are rich cylinders.

According to the second aspect, it is determined whether each cylinder of the evaluation target cylinder group is a rich cylinder and the polytropic index in the expansion stroke is calculated using the in-cylinder pressure sensor. In a region in which the air-fuel ratio is lower than the theoretical air-fuel ratio, a linear relationship that the polytropic index approximately linearly increases as the air-fuel ratio index value becomes higher than the theoretical air-fuel ratio is present between the polytropic index in the expansion stroke and the air-fuel ratio index value. Accordingly, when all the cylinders of the evaluation target cylinder group are rich cylinders, it is possible to calculate the difference in air-fuel ration between cylinders on the basis of the polytropic index in the expansion stroke of each cylinder of the evaluation target cylinder group.

In the first or second aspect, the ECU may determine that the air-fuel ratio is imbalanced between the cylinders when the difference in air-fuel ratio between cylinders calculated by the ECU is greater than a predetermined threshold value.

According to this aspect, it is possible to detect the air-fuel ratio imbalance between cylinders so as to include the rich cylinders using the in-cylinder pressure sensor by evaluating the calculated differences in air-fuel ratio between cylinders.

According to a third aspect of the invention, there is provided a diagnostic system for an internal combustion engine, the internal combustion engine including a plurality of cylinders, the diagnostic system being configured to evaluate an air-fuel ratio in an evaluation target cylinder group including at least some cylinders of the plurality of cylinders. The diagnostic system includes an in-cylinder pressure sensors and an electronic control unit (ECU). The in-cylinder pressure sensors are configured to detect an in-cylinder pressure in each of the cylinders in the evaluation target cylinder group. The ECU is configured to: (i) determine whether each cylinder of the evaluation target cylinder group is a rich cylinder in which an air-fuel ratio is lower than a theoretical air-fuel ratio or a lean cylinder in which the air-fuel ratio is higher than the theoretical air-fuel ratio; (j) calculate an air-fuel ratio index value in a present lean cylinder when the lean cylinder is present in the evaluation target cylinder group; (k) calculate a polytropic index in an expansion stroke for each cylinder of the evaluation target cylinder group on the basis of the in-cylinder pressure detected by the in-cylinder pressure sensors; (l) correlate relationship information for defining a relationship between the polytropic index in the expansion stroke and the air-fuel ratio index value with the polytropic index in the expansion stroke of a reference lean cylinder that is the lean cylinder of which the air-fuel ratio index value is calculated on the basis of the polytropic index in the expansion stroke and the air-fuel ratio index value of the reference lean cylinder; and (m) calculate the air-fuel ratio index value of the cylinder other than the reference lean cylinder on the basis of the relationship information correlated with the polytropic index in the expansion stroke of the reference lean cylinder and the polytropic index in the expansion stroke of the cylinder other than the reference lean cylinder in the evaluation target cylinder group.

According to the third aspect, it is determined whether each cylinder of the evaluation target cylinder group is a rich cylinder or a lean cylinder and the polytropic index in the expansion stroke is calculated using the in-cylinder pressure sensor. When a lean cylinder is present, the reference lean cylinder is set in which the air-fuel index value is calculated. There is a correlation between the polytropic index in the expansion stroke and the air-fuel ratio index value. According to the invention, the relationship information for defining the correlation is correlated with the polytropic index in the expansion stroke of the reference lean cylinder on the basis of the polytropic index in the expansion stroke and the air-fuel index value of the reference lean cylinder. Accordingly, it is possible to calculate the air-fuel index value so as to include rich cylinders on the basis of the polytropic index in the expansion stroke of the reference lean cylinder, the relationship information correlated as described above, and the polytropic index in the expansion stroke of a cylinder other than the reference lean cylinder in the evaluation target cylinder group.

In the first to third aspects, the ECU may be configured to calculate the polytropic index in the expansion stroke using the in-cylinder pressures at two or more points in the expansion stroke after a combustion finish point and before an opening timing of an exhaust valve and in-cylinder volumes at the two or more points in the expansion stroke.

According to this aspect, it is possible to suitably calculate the polytropic index in the expansion stroke.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a diagram illustrating a specific example of a method of detecting an air-fuel ratio imbalance between cylinders in Embodiment 1 of the invention;

FIG. 9 is a diagram illustrating a method of detecting an air-fuel ratio of each cylinder in Embodiment 3 of the invention;

DETAILED DESCRIPTION OF EMBODIMENTS

Figure 1:
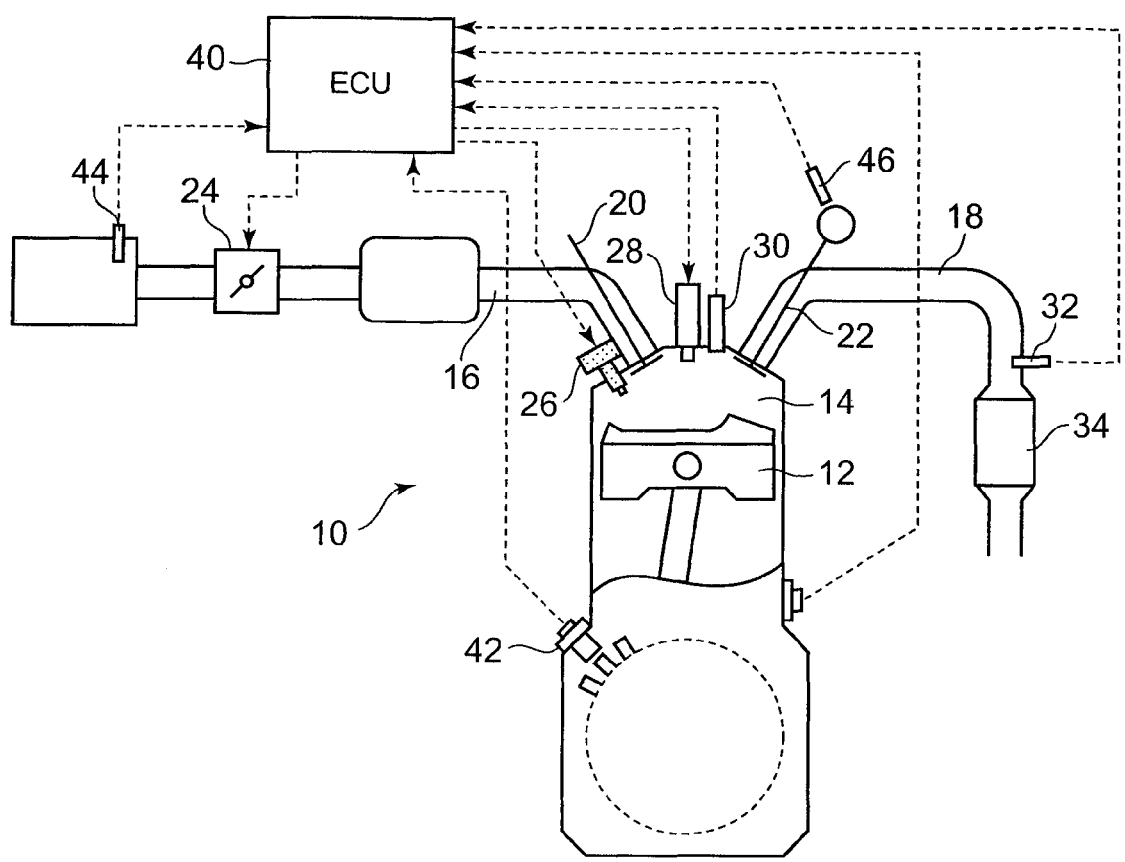
FIG. 1 is a diagram illustrating a system configuration of an internal combustion engine according to Embodiment 1 of the invention.

FIG. 1 is a diagram illustrating a system configuration of an internal combustion engine 10 according to Embodiment 1 of the invention. The system illustrated in FIG. 1 includes a multi-cylinder internal combustion engine 10. Here, the internal combustion engine 10 is assumed to be a spark-ignition in-line four-cylinder gasoline engine. A piston 12 is disposed in each cylinder of the internal combustion engine 10. A combustion chamber 14 is formed on the top side of the piston 12 in each cylinder. The combustion chamber 14 communicates with an intake air passage 16 and an exhaust gas passage 18.

An intake port of the intake air passage 16 is provided with an intake valve 20 opening and shutting the intake port, and an exhaust port of the exhaust gas passage 18 is provided with an exhaust valve 22 opening and shutting the exhaust port. The intake air passage 16 is provided with an electronically-controlled throttle valve 24.

Each cylinder of the internal combustion engine 10 is provided with an ignition unit including a fuel injection valve 26 directly injecting fuel into the combustion chamber 14 (the cylinder) and an ignition plug 28 igniting a fuel-air mixture. Each cylinder is provided with an in-cylinder pressure sensor 30 detecting an in-cylinder pressure. In the exhaust gas passage 18, an air-fuel ratio sensor 32 detecting an air-fuel ratio of exhaust gas is disposed at a position after the exhaust gas from the respective cylinder merges. The exhaust gas passage 18 downstream from the air-fuel ratio sensor 32 is provided with a three-way catalyst 34 as an exhaust gas purifying catalyst for purifying exhaust gas.

The system according to this embodiment includes an electronic control unit (ECU) 40. The input part of the ECU 40 is connected to various sensors for acquiring an operation state of the internal combustion engine 10, such as a crank angle sensor 42 for acquiring a crank angle and an engine rotation speed, an air flow meter 44 for measuring an amount of intake air, and an exhaust cam angle sensor 46 for detecting a rotation angle of an exhaust cam shaft (not illustrated) for driving the exhaust valve 22, in addition to the in-cylinder pressure sensor 30. The opening and shutting timings of the exhaust valve 22 that are adjusted by a variable exhaust valve timing mechanism (not illustrated) setting the opening and shutting timings of the exhaust valve 22 to be variable can be detected using the exhaust cam angle sensor 46. The output part of the ECU 40 is connected to various actuators for controlling the operation of the internal combustion engine 10, such as the throttle valve 24, the fuel injection valve 26, and the ignition unit. The ECU 40 has a function of AD-converting the output signal of the in-cylinder pressure sensor 30 in synchronization with the crank angle and acquiring the resultant signal. Accordingly, it is possible to detect the in-cylinder pressure at an arbitrary crank angle timing within a range allowable by the resolution of the AD conversion. The ECU 40 has a function of calculating the value of an in-cylinder volume, which is determined depending on the position of the crank angle, depending on the crank angle. The ECU 40 performs predetermined engine control such as fuel injection control and ignition control by driving various actuators on the basis of the outputs of the sensors and a predetermined program. As such engine control, the ECU 40 performs air-fuel ratio feedback control of adjusting an amount of fuel injected of each cylinder so that the air-fuel ratio of exhaust gas (that is, exhaust gas after the exhaust gas from the cylinders merge) flowing into the three-way catalyst 34 reaches a theoretical air-fuel ratio when a predetermined condition such as a condition in which the air-fuel ratio sensor 32 and the three-way catalyst 34 are activated while the internal combustion engine 10 is operated.

Figure 2:
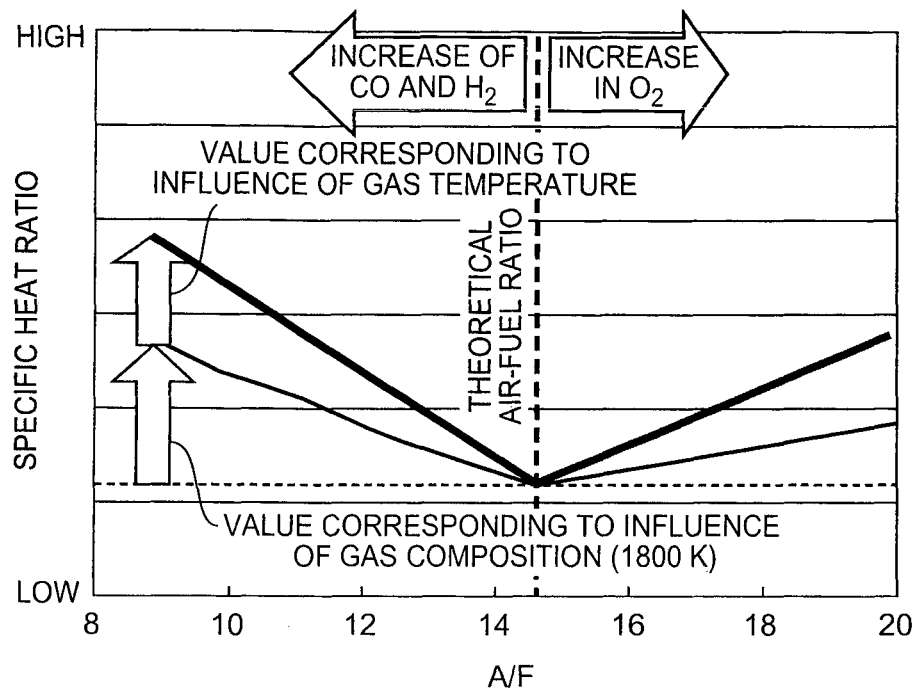
FIG. 2 is a diagram illustrating a relationship between a specific heat ratio (k) of burnt gas and an air-fuel ratio (A/F) that is noted in Embodiment 1 of the invention.
Figure 3:
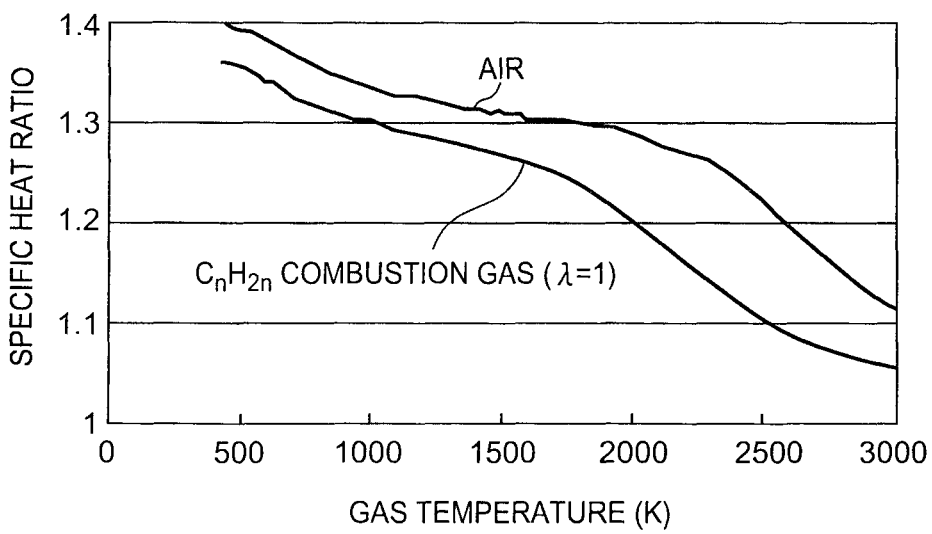
FIG. 3 is a diagram illustrating a relationship between the specific heat ratio and the gas temperature.

FIG. 2 is a diagram illustrating a relationship between a specific heat ratio (k) of burnt gas and an air-fuel ratio (A/F) that is noted in Embodiment 1 of the invention. FIG. 3 is a diagram illustrating a relationship between the specific heat ratio and the gas temperature. FIG. 3 illustrates combustion gas and air at a theoretical air-fuel ratio (excess air ratio $\lambda=1$) when hydrocarbon ($C_nH_{2n}$) having the same tendency as gasoline is used as fuel, not gasoline as the fuel of the internal combustion engine 10.

As illustrated in FIG. 2, the specific heat ratio of burnt gas in a cylinder (that is, in-cylinder gas in an expansion stroke after the combustion finish point) has a characteristic in which the specific heat ratio is lowest at the theoretical air-fuel ratio and becomes higher as the air-fuel ratio in the cylinder becomes higher or lower than the theoretical air-fuel ratio. There are two factors for acquisition of such a characteristic as follows.

The first reason is the gas composition. When hydrocarbon fuel such as gasoline is combusted, $CO_2$, $H_2O$, $CO$, $H_2$, and the like are produced. These products are diatomic molecules or triatomic molecules. The specific heat ratio of the diatomic molecules is about 1.4 at 0° C. and the specific heat ratio of the triatomic molecules ranges from about 1.3 to 1.33 at 0° C. That is, the specific heat ratio of the triatomic molecules is lower than that of the diatomic molecules. Accordingly, the greater the ratio of the triatomic molecules in the burnt gas becomes, the lower the specific heat ratio becomes. On the contrary, the greater the ratio of the diatomic molecules becomes, the higher the specific heat ratio becomes. At the theoretical air-fuel ratio, since fuel and oxygen react with each other in proper quantities by combustion, the ratio of $CO_2$ and $H_2O$ which are triatomic molecules is the greatest and thus the specific heat ratio is the lowest. On the contrary, at an air-fuel ratio lower than the theoretical air-fuel ratio, the ratio of $CO$ and $H_2$ which are diatomic molecules is greater than that at the theoretical air-fuel ratio as the air-fuel ratio becomes higher. On the other hand, at an air-fuel ratio higher than the theoretical air-fuel ratio, the ratio of $O_2$ which is a diatomic molecule is greater than that at the theoretical air-fuel ratio as the air-fuel ratio becomes lower. Accordingly, the higher or lower the air-fuel ratio becomes than the theoretical air-fuel ratio, the higher the specific heat ratio becomes. As a result, in consideration of a value corresponding to the influence of the gas composition, the specific heat ratio of the burnt gas is the lowest at the theoretical air-fuel ratio and becomes higher as the air-fuel ratio becomes higher or lower than the theoretical air-fuel ratio, as indicated by a thin line in FIG. 2.

The second reason is the gas temperature. When it is assumed that the amount of air is the same, the ratio of an amount of combustion gas (=sum of amount of air and amount of fuel which contribute to combustion) to the amount of heat emitted of fuel is the lowest at the theoretical air-fuel ratio, and becomes higher as the air-fuel ratio becomes higher or lower than the theoretical air-fuel ratio. Accordingly, the higher or lower the air-fuel ratio becomes than the theoretical air-fuel ratio, the lower the temperature of the burnt gas becomes. This point will be more specifically described. When the air-fuel ratio is lower than the theoretical air-fuel ratio, the amount of heat emitted is not much changed from that at the theoretical air-fuel ratio, but the amount of combustion gas increases due to the increase in the amount of fuel. On the other hand, when the air-fuel ratio is higher than the theoretical air-fuel ratio, the decrease in the amount of heat emitted due to the decrease in the amount of fuel has a greater influence on the gas temperature than the decrease in the amount of combustion gas due to the decrease in the amount of fuel. As illustrated in FIG. 3, the lower the gas temperature becomes, the higher the specific heat ratio becomes. Accordingly, since the value corresponding to the influence of the gas temperature is added to the value corresponding to the influence of the gas composition, the characteristic that the above-mentioned ratio is the lowest at the theoretical air-fuel ratio and becomes higher as the air-fuel ratio becomes higher or lower than the theoretical air-fuel ratio is acquired more markedly, as indicated by a solid line in FIG. 2.

When the specific heat ratio of the burnt gas can be calculated using the output value of the in-cylinder pressure sensor 30, it is possible to acquire the air-fuel ratio using the relationship illustrated in FIG. 2. However, since the actual burnt gas is not ideal gas and a cooling loss occurs, the expansion stroke is not an adiabatic process and cylinder compression leakage can also occur. Accordingly, it is difficult to estimate the specific heat ratio of the burnt gas using the output value of the in-cylinder pressure sensor 30. On the other hand, the expansion stroke can be treated as a polytropic variation in consideration of exchange of heat with the outside.

Figure 4:
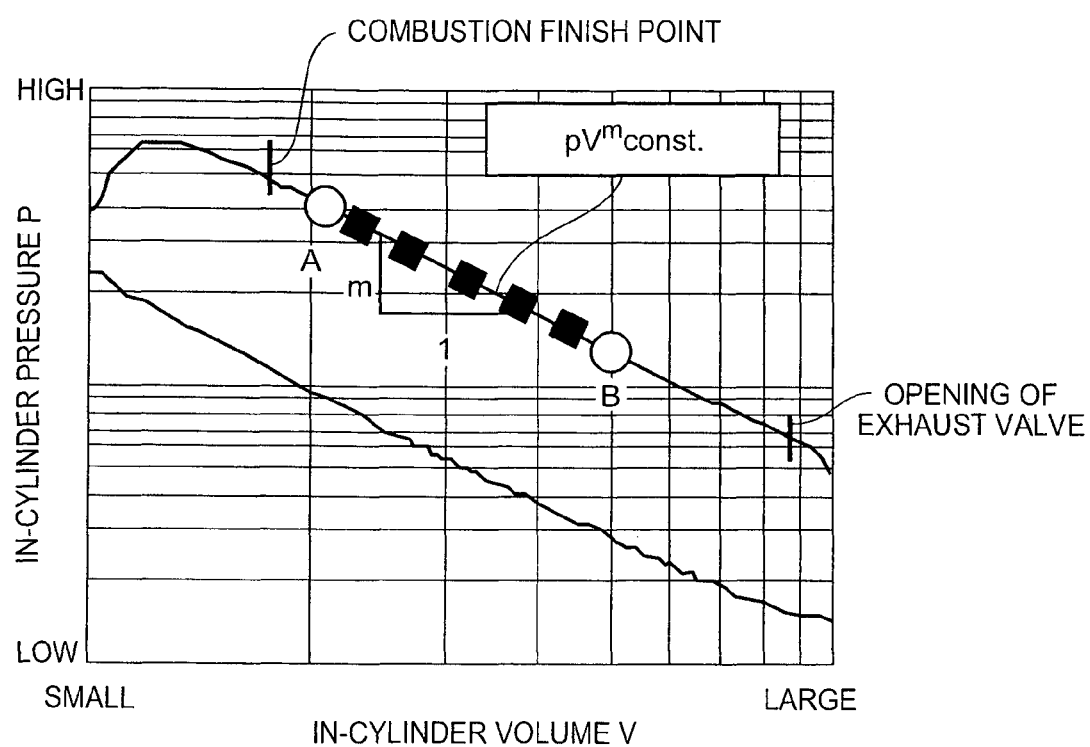
FIG. 4 is a double logarithmic P-V diagram in a compression stroke and an expansion stroke of the internal combustion engine.

FIG. 4 is a double logarithmic P-V diagram in compression strokes and expansion strokes of the internal combustion engine 10. In the polytropic variation of an expansion stroke, it can be thought that the relationship ($PV^m$=constant) is established by defining the polytropic index as m. As illustrated in FIG. 4, the relationship between the in-cylinder pressure P and the in-cylinder volume V in the expansion stroke is expressed by a linear line with a slope of −m in the double logarithmic graph. In an expansion stroke after the combustion period ends (here, after the combustion finish point and before the opening timing of the exhaust valve 22), a polytropic index m has a value (more specifically, a value very close to the specific heat ratio of the burnt gas out of the combustion parameters which can be calculated using the in-cylinder pressure sensor 30) corresponding to the specific heat ratio of the burnt gas acting on an actual machine.

The polytropic index m in an expansion stroke can be calculated using Expression (2) by using the relational expression and the in-cylinder pressure P and the in-cylinder volume V at two points (corresponding to point A and point B in FIG. 4) in the expansion stroke after the combustion finish point and before the opening timing of the exhaust valve 22 and considering that the polytropic indices m at the two points are constant. The polytropic index m is not limited to the calculation using only two points in the expansion stroke after the combustion finish point and before the opening timing of the exhaust valve 22, but may be calculated using a statistical process using the in-cylinder pressure P and the in-cylinder volume V at two or more points in the expansion stroke.

$$m = \log_{\frac{V_B}{V_A}}\left(\frac{P_A}{P_B}\right) \quad (1)$$

Since the polytropic index m in the expansion stroke after the combustion period ends is a value close to the specific heat ratio of the burnt gas, the same relationship as the relationship between the specific heat ratio and the air-fuel ratio, which is described above with reference to FIG. 2, is established between the polytropic index m and the air-fuel ratio (see FIG. 6). Since the polytropic index m can be calculated in an actual machine using the output of the in-cylinder pressure sensor 30 and Expression (1), the air-fuel ratio can be acquired from the relationship between the polytropic index m and the air-fuel ratio. However, the specific heat ratio or the polytropic index m is not uniformly determined with respect to the air-fuel ratio. This is because the polytropic index m is affected by the gas temperature in the cylinder varying depending on the operating condition (such as an engine load, an engine rotation speed, and a coolant temperature).

Therefore, in this embodiment, a map in which relationship information (a V-shaped curve illustrated in FIG. 6, which is referred to as "m-AF curve") for defining the relationship between the polytropic index m and the air-fuel ratio is correlated with the operating conditions is stored in the ECU 40. Accordingly, how the polytropic index m varies (that is, the shape of the m-AF curve) with a variation in the air-fuel ratio can be understood regardless of the operating condition. However, even when the shape of the m-AF curve is acquired from the map, it is difficult to acquire such accuracy to specify the value of the polytropic index m and the value of the air-fuel ratio as absolute values using the m-AF curve. That is, in a state in which the position in the vertical direction of the m-AF curve in FIG. 6 is accurately specified, it is difficult to acquire the m-AF curve from the map due to the influence of the gas temperature or the like.

Therefore, in this embodiment, it is determined for each cylinder whether a cylinder is a rich cylinder in which the air-fuel ratio is lower than the theoretical air-fuel ratio or a lean cylinder in which the air-fuel ratio is higher than the theoretical air-fuel ratio, on the basis of the amount of heat emitted Q (more specifically, the maximum amount of heat emitted Qmax) of each cylinder. When a lean cylinder is present, a degree of leanness of the air-fuel ratio with respect to the theoretical air-fuel ratio in the corresponding lean cylinder is estimated on the basis of the difference in the maximum amount of heat emitted Qmax by cylinders. The polytropic index m in the expansion stroke after the combustion finish point and before the exhaust valve 22 is opened is calculated for each cylinder. Then, on the basis of the polytropic index m in the expansion stroke and the degree of leanness of a reference lean cylinder, which is a lean cylinder in which the degree of leanness of the air-fuel ratio is estimated, a process of correlating the m-AF curve based on the current operating condition with the polytropic index m in the expansion stroke of the reference lean cylinder is performed. The difference in air-fuel ratio between cylinders is calculated on the basis of the m-AF curve correlated with the polytropic index m in the expansion stroke of the reference lean cylinder and the polytropic index m in the expansion stroke of each cylinder. On the basis of the calculated difference, it is determined whether the air-fuel ratio at a level to be detected is imbalanced.

Figure 5:
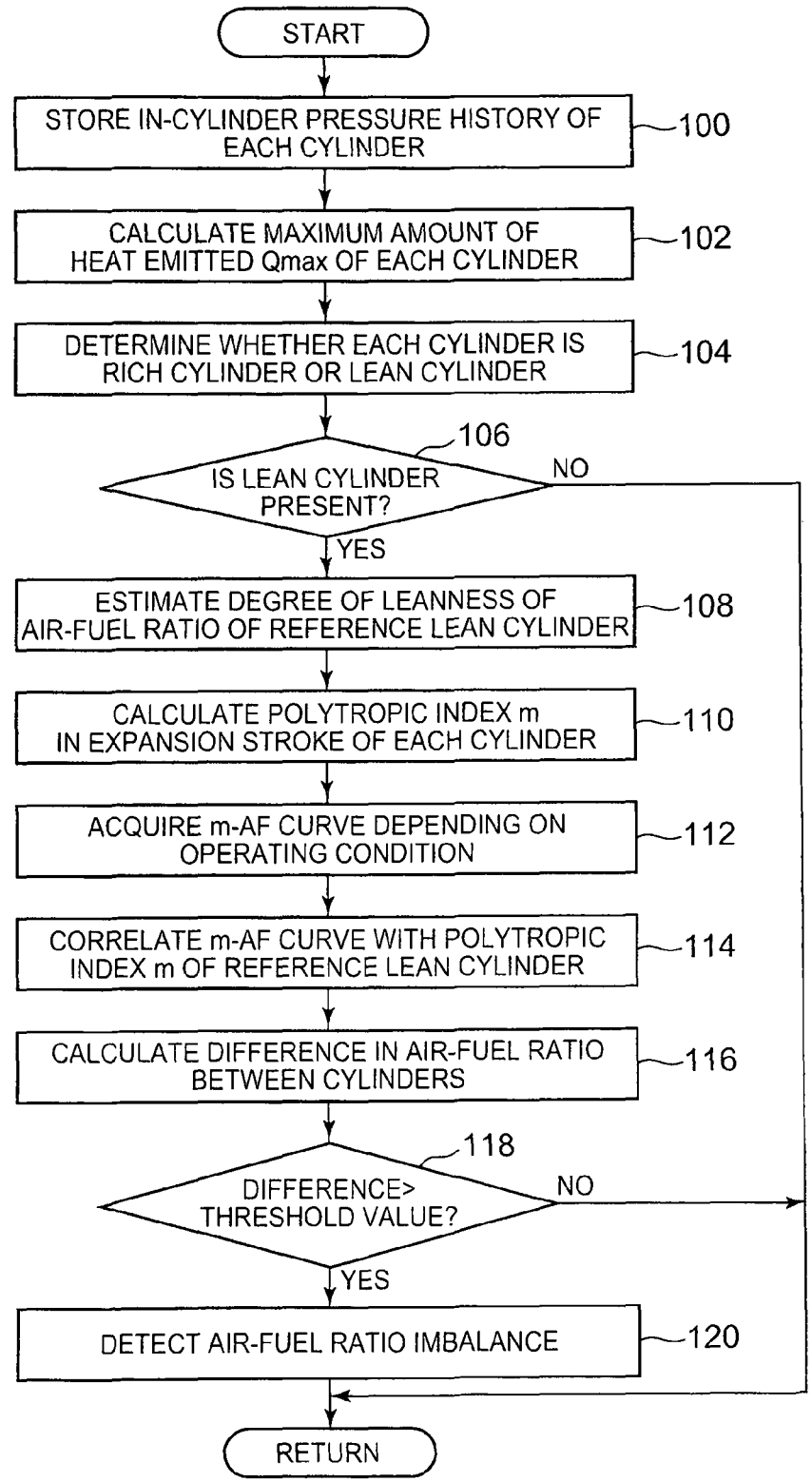
FIG. 5 is a flowchart illustrating a control process that is performed in Embodiment 1 of the invention.

FIG. 5 is a flowchart illustrating a control process that is performed by the ECU 40 so as to implement the method of detecting the air-fuel ratio imbalance between cylinders in Embodiment 1 of the invention. This control process is started when a predetermined condition in which the air-fuel ratio imbalance between cylinders is detected is established. It is assumed that the condition is basically established in a normal operation in which the air-fuel ratio of exhaust gas flowing into the three-way catalyst 34 (that is, the air-fuel ratio of exhaust gas after exhaust gas from all the cylinders merges) by the air-fuel ratio feedback control is controlled to be the theoretical air-fuel ratio. When unevenness of the air-fuel ratio at a level having an influence on the detection process is not recognized or the great variation in the amount of intake air is not recognized, this detection method may be performed even when the internal combustion engine 10 is not in a strict normal state.

In the control process illustrated in FIG. 5, the ECU 40 first stores in-cylinder pressure data (history) in synchronization with the crank angle in one cycle of each cylinder (all cylinders) in consecutive cycles using the detection value of the in-cylinder pressure sensor (CPS) 30 (step 100).

Then, the ECU 40 calculates the maximum amount of heat emitted Qmax of each cylinder using the stored in-cylinder pressure history (step 102). Since the amount of heat emitted Q with the in-cylinder pressure P and the in-cylinder volume V at a crank angle can be calculated using Expression (2), the maximum amount of heat emitted Qmax can be calculated as the maximum values of the calculated amount of heat emitted Q. The end time of the period of calculating data of the amount of heat emitted Q in synchronization with the crank angle is the opening timing of the exhaust valve 22 that is detected using the exhaust cam angle sensor 46.

$$Q = \int PdV + \frac{1}{\kappa - 1}(PV - P_0 V_0) \quad (2)$$

In Expression (2), $P_0$ and $V_0$ represent the in-cylinder pressure and the in-cylinder volume at a calculation start point $\theta_0$ (a predetermined crank angle in a compression stroke (here, after the intake valve 20 is shut) that is determined with a margin from an assumed combustion start point).

Then, the ECU 40 determines whether each cylinder of the internal combustion engine 10 is a rich cylinder or a lean cylinder on the basis of the value of the maximum amount of heat emitted Qmax of each cylinder (step 104). Here, FIG. 6 is a diagram illustrating a specific example of the method of detecting the air-fuel ratio imbalance between cylinders in Embodiment 1 of the invention, and the processes subsequent to step 104 will be described with reference to the specific example illustrated in FIG. 6. More specifically, FIG. 6 is a diagram illustrating the relationship between the polytropic index m and the air-fuel ratio in the same operating condition as the relationship between the calculated value of the maximum amount of heat emitted Qmax and the air-fuel ratio.

The air-fuel ratio imbalance is not limited to a case in which only the air-fuel ratio of one cylinder is deviated from the air-fuel ratios of the other cylinders. However, examples of a case that is basically assumed at the time of performing the air-fuel ratio feedback control includes a case in which the air-fuel ratio of one cylinder is greatly deviated from the air-fuel ratios of the other three rich cylinders to the lean side and a case in which the air-fuel ratio of one cylinder is greatly deviated from the other three lean cylinders to the rich side, as illustrated in FIG. 6. More specifically, the situation in which the target air-fuel ratio of the air-fuel ratio of exhaust gas upstream of the three-way catalyst 34 is controlled to be the theoretical air-fuel ratio by the air-fuel ratio feedback control is a situation in which the air-fuel ratio of exhaust gas after exhaust gas from the cylinders merges is equal to the theoretical air-fuel ratio. Accordingly, except for the case in which the air-fuel ratios of all the cylinders are equal to the theoretical air-fuel ratio, when a lean cylinder is present, a rich cylinder is also present.

In step 104, one cylinder or cylinder group in which the maximum amount of heat emitted Qmax is relatively large is determined to be a rich cylinder, and one cylinder in which the maximum amount of heat emitted Qmax is smaller than that of the rich cylinder is determined to be a lean cylinder. As illustrated in FIG. 6, it can be seen that the maximum amount of heat emitted Qmax has not sensitivity to the air-fuel ratio in the rich region in which the air-fuel ratio is lower than the theoretical air-fuel ratio and does not much vary with the variation in the air-fuel ratio. Accordingly, under the control of the air-fuel ratio toward the theoretical air-fuel ratio by the feedback control, a cylinder or cylinder group in which the maximum amount of heat emitted Qmax is relatively large can be determined to be a rich cylinder and a cylinder or cylinder group in which the maximum amount of heat emitted Qmax is relatively small can be determined to be a lean cylinder. On the other hand, in a situation in which the air-fuel ratios of all the cylinders are accurately controlled in the vicinity of the theoretical air-fuel ratio, the maximum amounts of heat emitted Qmax of all the cylinders have the same value. Since this control process is performed to detect the air-fuel ratio imbalance between cylinders, it may be determined that no rich cylinder and no lean cylinder are present in this case. In order to clearly distinguish this case from cases in which a rich cylinder and a lean cylinder are present, only a case in which a predetermined difference in the maximum amount of heat emitted Qmax between the cylinders is recognized may be considered to correspond to the case in which a rich cylinder and a lean cylinder are present, and the above-mentioned determination process may be performed in this case.

Then, the ECU 40 determines whether a lean cylinder is present (step 106). The determination result of step 106 is basically positive under the theoretical air-flow ratio, except for the case in which a significant difference in the maximum amount of heat emitted Qmax for distinguishing a rich cylinder and a lean cylinder is not present between the cylinders.

When the determination result of step 106 is positive, the ECU 40 estimates the degree of leanness of the air-fuel ratio with respect to the theoretical air-fuel ratio in a reference lean cylinder (step 108). Here, the reference lean cylinder is a lean cylinder serving as a reference for calculating the difference in air-fuel ratio between cylinders through the processes of steps 114 and 116. The example illustrated in FIG. 6 is a case in which only one lean cylinder is present. Accordingly, in this case, the present lean cylinder corresponds to the reference lean cylinder. When plural lean cylinders are present, one or more lean cylinders can be set as the reference lean cylinder. Since this control process is performed to detect the air-fuel ratio imbalance, it is preferable that a lean cylinder (that is, a lean cylinder in which the air-fuel ratio is the lowest) in which the maximum amount of heat emitted Qmax is the smallest be set as the reference lean cylinder to detect the difference between cylinders having high air-fuel ratios. In some aspects for detecting the air-fuel ratio imbalance, the average value of the maximum amounts of heat emitted Qmax of plural lean cylinders may be calculated and the average value may be used as basis for calculating the degree of leanness of the reference lean cylinder. That is, in this case, the difference in air-fuel ratio between cylinders is calculated on the basis of the average value of the air-fuel ratios of the plural lean cylinders and the air-fuel ratio of a rich cylinder.

In step 108, it is considered that the value of the maximum amount of heat emitted Qmax of a rich cylinder is equal to the value of the maximum amount of heat emitted Qmax at the theoretical air-fuel ratio, and the degree of leanness of the air-fuel ratio with respect to the theoretical air-fuel ratio in the lean cylinder is estimated on the basis of a degree of decrease of the maximum amount of heat emitted Qmax of the lean cylinder with respect to the maximum amount of heat emitted Qmax of the rich cylinder. More specifically, the smaller the maximum amount of heat emitted Qmax of the reference lean cylinder becomes, the larger the degree of leanness is estimated to be. The absolute value of the maximum amount of heat emitted Qmax varies depending on the engine load or the like. Accordingly, the degree of leanness depending on a degree of relative decrease in the maximum amount of heat emitted Qmax of the lean cylinder with respect to the maximum amount of heat emitted Qmax of the rich cylinder is estimated on the basis of the degree of relative decrease and the degree of leanness of the air-fuel ratio with respect to the theoretical air-fuel ratio. In the example illustrated in FIG. 6, the degree of leanness of the air-fuel ratio in the reference lean cylinder is estimated through the above-mentioned process and the air-fuel ratio of the reference lean cylinder is acquired to have a value of about 18. According to this method, the vertical position of the curve of the maximum amount of heat emitted Qmax illustrated in FIG. 6 is specified using the value of the maximum amount of heat emitted Qmax in the rich cylinder and the degree of leanness of the air-fuel ratio corresponding to the maximum amount of heat emitted Qmax in the lean cylinder is estimated using the curve of which the position is specified. In the case in which plural rich cylinders are present as in the example illustrated in FIG. 6, the maximum amount of heat emitted Qmax serving as a reference for estimating the degree of leanness may be a value in one rich cylinder or may be the average value of the maximum amounts of heat emitted Qmax in the plural rich cylinders. When the relationship (the curve) between the maximum amount of heat emitted Qmax and the air-fuel ratio can be acquired depending on the engine load or the like, the air-fuel ratio corresponding to the maximum amount of heat emitted Qmax in the reference lean cylinder may be directly acquired using the curve depending on the current engine load or the like and the degree of leanness may be estimated.

Then, the ECU 40 calculates the polytropic index m in the expansion stroke of each cylinder using the in-cylinder pressures $P_A$, $P_B$ and the in-cylinder volumes $V_A$, $V_B$ at two points, which are acquired using the in-cylinder pressure sensor 30 in the expansion stroke after the combustion finish point (the crank angle at which the maximum amount of heat emitted Qmax is acquired) and before the opening timing of the exhaust valve 22, and Expression (1) (step 110).

Then, the ECU 40 acquires the m-AF curve depending on the current operating condition with reference to a predetermined map stored therein (step 112). Then, the ECU 40 performs a process of correlating the m-AF curve depending on the current operating condition with the polytropic index m in the expansion stroke of the reference lean cylinder on the basis of the polytropic index m in the expansion stroke of the reference lean cylinder and the degree of leanness (step 114). Specifically, in the example illustrated in FIG. 6, the vertical position of the m-AF curve in the xy plane with the polytropic index m as the y coordinate and the air-fuel ratio as the x coordinate is specified so that point A which is specified by the polytropic index m of the reference lean cylinder and the air-fuel ratio (the air-fuel ratio value as a reference acquired from the degree of leanness) is located in the m-AF curve. Accordingly, the relative difference in the air-fuel ratio can be evaluated using the value of the polytropic indices m and the m-AF curves of other cylinders with the reference lean cylinder as a reference. The specifying of the position of the m-AF curve in step 114 does not need to be performed whenever the air-fuel ratio imbalance in the same operating condition is detected, but may be performed using the stored m-AF curve when the m-AF curve of which the position has been specified is stored in correlation with the operating conditions.

Then, the ECU 40 calculates the difference in air-fuel ratio between cylinders (step 116). Specifically, in the example illustrated in FIG. 6, since the difference between the polytropic index m of the reference lean cylinder and the polytropic index m of each rich cylinder can be specified in the m-AF curve by specifying the position of the m-AF curve, a value serving as a reference of the air-fuel ratio of the rich cylinders is acquired using the values of the air-fuel ratios at the position at which the polytropic indices m of the rich cylinders other than the reference lean cylinder are acquired. The differences in air-fuel ratio between the reference lean cylinder and the rich cylinders are calculated from the differences between the value of the air-fuel ratio of the reference lean cylinder and the values of the air-fuel ratios of the rich cylinders. Since the difference in air-fuel ratio between the reference lean cylinder and all the other cylinders can be acquired using this method, the difference in air-fuel ratio between cylinders other than the reference lean cylinder can calculate. This is true of a case in which a lean cylinder other than the reference lean cylinder is present, unlike in the example illustrated in FIG. 6. In the example illustrated in FIG. 6, the maximum difference in air-fuel ratio from the air-fuel ratio of the reference lean cylinder is acquired as the maximum difference in air-fuel ratio between cylinders. In step 116, the difference in air-fuel ratio between two cylinders is calculated, but a method of calculating the difference in air-fuel ratio for detecting the air-fuel ratio imbalance is not limited to this method. That is, in the example illustrated in FIG. 6, the difference between the value of the air-fuel ratio acquired from the average value of the polytropic indices m of plural rich cylinders and the m-AF curve and the value of the air-fuel ratio of the reference lean cylinder may be calculated as the difference in air-fuel ratio between cylinders.

Then, the ECU 40 determines whether the difference in air-fuel ratio between cylinders (the acquired maximum difference) calculated in step 116 is greater than a predetermined threshold value (step 118). The threshold value used in step 118 is a value set in advance as a threshold value for determining whether the calculated difference in air-fuel ratio between cylinders indicates the air-fuel ratio imbalance state at the level to be detected in the internal combustion engine 10. When the determination result of step 118 is positive, the ECU 40 determines that the corresponding cylinder is in the air-fuel ratio imbalance state at the level to be detected (step 120).

In the relationship between the specific heat ratio and the air-fuel ratio that is noted in this embodiment, the specific heat ratio at the theoretical air-fuel ratio is the lowest and the specific heat ratio becomes higher as the air-fuel ratio becomes higher or lower than the theoretical air-fuel ratio, as described above. Accordingly, between the rich cylinders or between the lean cylinders, it can be said that the larger the difference in specific heat ratio becomes, the larger the difference in air-fuel ratio becomes, but it cannot be said that the same is true between a rich cylinder and a lean cylinder. Accordingly, in this embodiment, the polytropic index m in the expansion index having a value which can be calculated using the output of the in-cylinder pressure sensor 30 and having the same sensitivity as the specific heat ratio to the air-fuel ratio is calculated for each cylinder and it is determined whether the corresponding cylinder is a rich cylinder or a lean cylinder. However, as described above, only by storing the relationship (m-AF curve) between the polytropic index m in the expansion stroke and the air-fuel ratio as a curve depending on the operating condition, it is difficult to acquire accuracy sufficient to specify the value of the polytropic index m and the value of the air-fuel ratio as absolute values.

In the above-mentioned control process illustrated in FIG. 5, it is determined whether each cylinder is a rich cylinder or a lean cylinder. When a lean cylinder is present, a reference lean cylinder is selected and then the degree of leanness of the air-fuel ratio from the theoretical air-fuel ratio in the reference lean cylinder is estimated. Then, by correlating the degree of leanness of the air-fuel ratio in the reference lean cylinder and the polytropic index m in the expansion stroke with the m-AF curve, the position of the m-AF curve is specified. Here, a reason for using a lean cylinder as a reference instead of a rich cylinder in calculating the difference in air-fuel ratio between cylinders using the above-mentioned method will be described. Since the amount of heat emitted Q which is a combustion parameter capable of being calculated using the output value of the in-cylinder pressure sensor 30 has high sensitive to the air-fuel ratio in a region in which the air-fuel ratio is lower than the theoretical air-fuel ratio as can be seen from the waveform illustrated in FIG. 6, the degree of leanness can be determined from the value of the maximum amount of heat emitted Qmax. However, the maximum amount of heat emitted Qmax has low sensitivity to the air-fuel ratio because the amount of heat emitted Q is restricted by the amount of oxygen in a region in which the air-fuel ratio is lower than the theoretical air-fuel ratio. That is, in the rich-side region, it is difficult to directly determine the degree of richness using the value of the maximum amount of heat emitted Qmax. This is true of a combustion rate to be described later. Accordingly, a lean cylinder can be used as the reference of the above-mentioned method. In the above-mentioned method according to this embodiment, it is possible to calculate the difference in air-fuel ratio between cylinders using the polytropic index m of each cylinder, in which it is determined whether the cylinder is a rich cylinder or a lean cylinder, and the m-AF curve, regardless of whether a rich cylinder is included as a calculation target. By determining the magnitude of the calculated difference, it is possible to determine whether the corresponding cylinder including a rich cylinder is in the air-fuel ratio imbalance state at a high level to be detected.

The method of estimating the air-fuel ratio using the polytropic index in an expansion stroke is known. However, the polytropic index in an expansion stroke used in the method according to the related art has low sensitivity to the air-fuel ratio, unlike the polytropic index in an expansion stroke used in the method according to this embodiment, and thus the method according to the related art has low detectability of an air-fuel ratio. More specifically, the polytropic index in an expansion stroke is related to burnt gas, but the polytropic index in a compression stroke is related to unburnt air-fuel mixture. The method according to the related art pays attention to the fact that the polytropic index in a compression stroke varies when the air-fuel ratio varies due to the variation in the amount of fuel. However, the variation in the polytropic index due to the variation in the amount of fuel attributes to the influence of the variation in a molar ratio of fuel, not a weight ratio of fuel included in the unburnt air-fuel mixture. Since the molar ratio of hydrocarbon-based fuel having a large molecular weight in the air-fuel mixture is low, the variation in the polytropic index with respect to the variation in the air-fuel ratio due to the variation in the amount of fuel is small. Accordingly, the sensitivity of the polytropic index in a compression stroke to the air-fuel ratio is low and thus the detectability of the air-fuel ratio in the method according to the related art is low.

In Embodiment 1, the method of detecting the air-fuel ratio imbalance between cylinders, which is performed in the air-fuel ratio feedback control in which the theoretical air-fuel ratio is used as the target air-fuel ratio, is exemplified above. However, the target of the detection method described in Embodiment 1 is not limited to the case in which the air-fuel ratios of the cylinders are uneven to the rich side and the lean side with respect to the theoretical air-fuel ratio in performing the feedback control. That is, the detection method can be similarly applied to a case in which the air-fuel ratios of all the cylinders are uneven in the region in which the air-fuel ratio is higher than the theoretical air-fuel ratio in a lean-burning operation in which combustion is carried out at an air-fuel ratio higher than the theoretical air-fuel ratio.

Embodiment 2 of the invention will be described below with reference to FIGS. 7 and 8. A system according to this embodiment can be implemented by causing the ECU 40 to perform a control process illustrated in FIG. 8 instead of the control process illustrated in FIG. 5 using the hardware configuration illustrated in FIG. 1.

Figure 7:
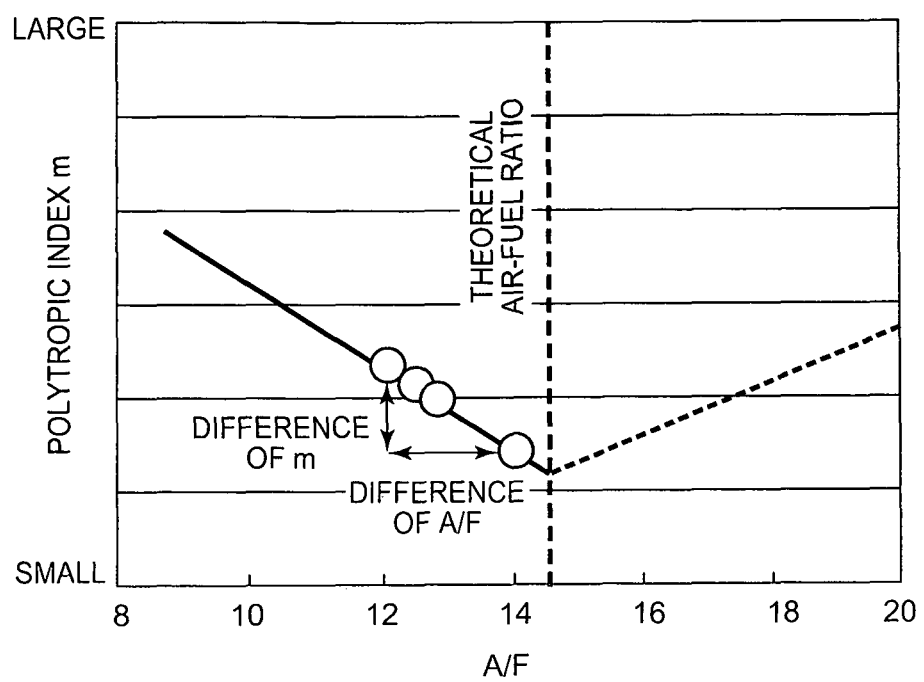
FIG. 7 is a diagram illustrating a method of detecting an air-fuel ratio imbalance between cylinders in Embodiment 2 of the invention.

FIG. 7 is a diagram illustrating a method of detecting an air-fuel ratio imbalance between cylinders in Embodiment 2 of the invention.

In the detection method according to this embodiment, a rich-burning operation is assumed in which the air-fuel ratios of all the cylinders are controlled so as to reach an air-fuel ratio (for example, output air-fuel ratio (about 12.5)) lower than the theoretical air-fuel ratio. More specifically, in the rich-burning operation, the air-fuel ratios of the cylinders may be uneven only in a rich region in which the air-fuel ratio is lower than the theoretical air-fuel ratio, as illustrated as an example in FIG. 7, depending on the degree of unevenness of the air-fuel ratio. The detection method according to Embodiment 1 is performed after the selection of the reference lean cylinder in which the degree of leanness of the air-fuel ratio with respect to the theoretical air-fuel ratio has been estimated and thus cannot be applied to the case illustrated in FIG. 7. Accordingly, in this embodiment, the air-fuel ratio imbalance between cylinders is detected using the following method in a situation in which the air-fuel ratios of all the cylinders are uneven only in the rich region.

Paying attention to only a part of a rich region in the m-AF curve, as indicated by a solid line in FIG. 7, a linear relationship that the polytropic index m increases substantially linearly as the air-fuel ratio becomes lower than the theoretical air-fuel ratio is established between the polytropic index m in an expansion stroke and the air-fuel ratio. On the other hand, when the reference lean cylinder in which the degree of leanness of the air-fuel ratio has been estimated as described above is not used, there is a problem in that it is difficult to correlate the polytropic index m and the air-fuel ratio with absolute values using the m-AF curve. That is, the values of the polytropic indices m of the cylinders cannot be loaded to the actual m-AF curve depending on the current operating condition as illustrated in FIG. 7, by only calculating the polytropic indices m of the cylinders. However, by considering that the linear relationship is established between the polytropic index m and the air-fuel ratio in the rich region, the relative difference in air-fuel ratio between cylinders can be estimated from the magnitude of the difference in the polytropic index m between cylinders.

Therefore, in this embodiment, when all the cylinders are rich cylinders, the difference in air-fuel ratio between cylinders is calculated on the basis of the polytropic index m in an expansion stroke of each cylinder. More specifically, the larger the difference becomes, the larger the difference in air-fuel ratio between cylinders is calculated to be using the difference in the polytropic index m between cylinders.

Figure 8:
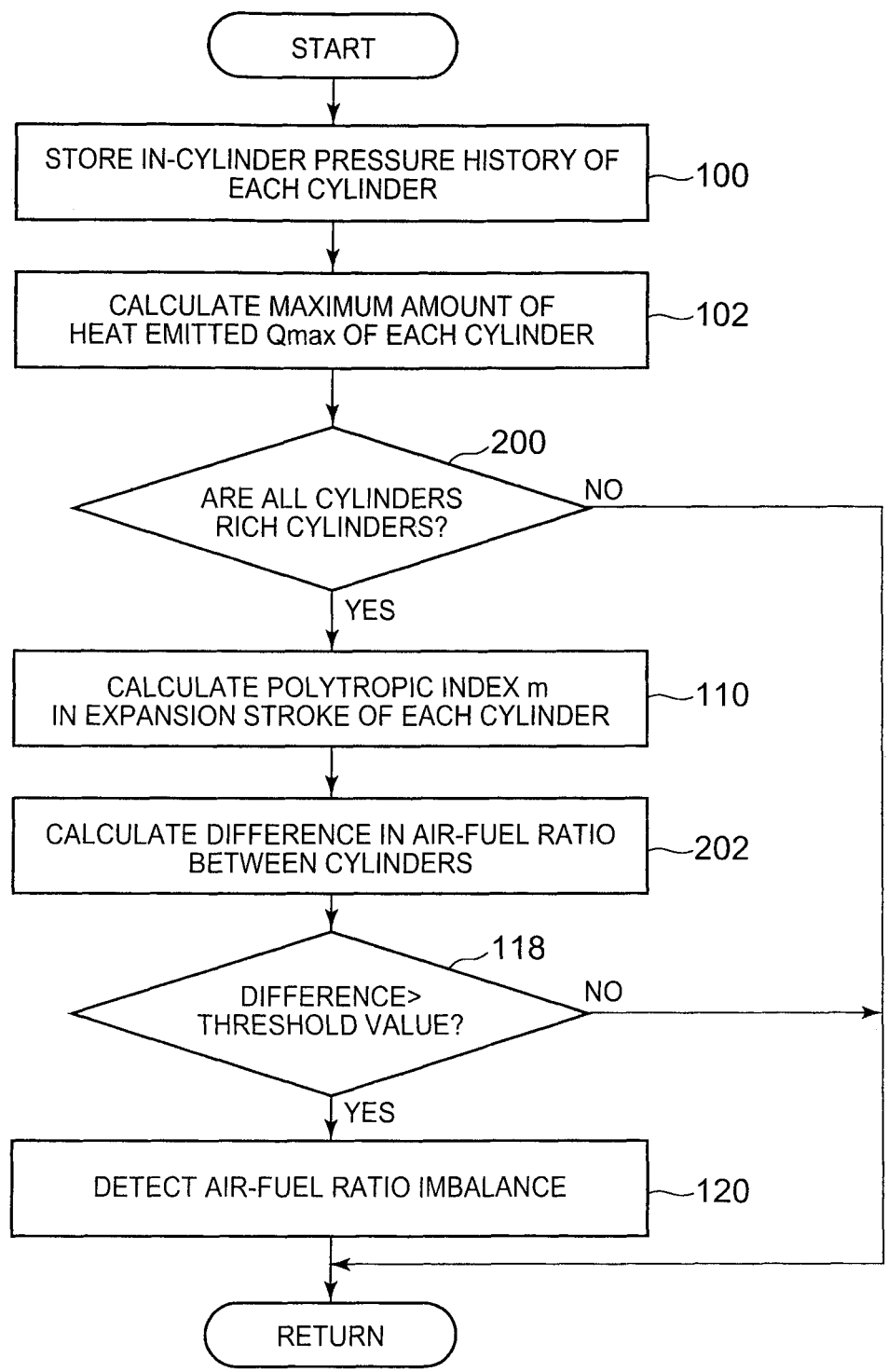
FIG. 8 is a flowchart illustrating a control process that is performed in Embodiment 2 of the invention.

FIG. 8 is a flowchart illustrating a control process that is performed by the ECU 40 so as to implement the method of detecting an air-fuel ratio imbalance between cylinders in Embodiment 2 of the invention. In FIG. 8, the same steps as illustrated in FIG. 5 in Embodiment 1 will be referenced by the same reference numerals and description thereof will not be repeated or will be made in brief. Unlike the control process illustrated in FIG. 5, this control process is started on the condition that another condition related to the detecting of the air-fuel ratio imbalance between cylinders in a rich-burning operation is established.

In the control process illustrated in FIG. 8, the ECU 40 determines whether all the cylinders are rich cylinders (step 200) after the maximum amount of heat emitted Qmax of each cylinder is calculated using the in-cylinder pressure in step 102. The specific method of the determination process of step 200 is not particularly limited and, for example, the value of the maximum amount of heat emitted Qmax of each cylinder may be used. That is, as described above, since the maximum amount of heat emitted Qmax has no sensitivity to the air-fuel ratio in the rich region, the maximum amounts of heat emitted Qmax are close to each other regardless of the degree of richness. Accordingly, when the values of the maximum amount of heat emitted Qmax of all the cylinders in the rich-burning operation are within a predetermined range, it can be determined that all the cylinders are rich cylinders.

Then, the ECU 40 calculates the difference in air-fuel ratio between cylinders using the calculated polytropic indices m (step 202) after calculating the polytropic index m in an expansion stroke of each cylinder in step 110. The ECU 40 stores a map in which the relationship between the difference in the polytropic index m and the difference in the air-fuel ratio is determined in advance depending on the operating condition in consideration of the slope of the rn-AF curve in the rich region in each operating condition. The ECU 40 calculates the difference in air-fuel ratio between cylinders on the basis of the difference in the polytropic index m between two cylinders with reference to the map. The difference in air-fuel ratio between cylinders is calculated for all combinations while changing a combination of cylinders to be calculated. The largest difference is finally acquired. In this control process, the processes subsequent to steps 118 are performed using the acquired largest difference.

In the above-mentioned control process illustrated in FIG. 8, even when all the cylinders are rich cylinders (that is, when a reference lean cylinder is not present), it is possible to detect the air-fuel ratio imbalance between cylinders using the polytropic index m in an expansion stroke. In addition, since it is difficult to the degree of richness of the air-fuel ratio with respect to the theoretical air-fuel ratio using only the combustion parameter (for example, the amount of heat emitted Q or the combustion rate) which is acquired using the output of the in-cylinder pressure sensor 30, it is difficult to acquire a rich cylinder serving as a reference for calculating the difference in air-fuel ratio between cylinders using the polytropic index m. However, in the method according to this embodiment, since the relative difference in air-fuel ratio between cylinders can be acquired depending on the difference in the polytropic index m between cylinders, it is possible to detect the air-fuel ratio imbalance between cylinders without using a reference rich cylinder.

Embodiment 3 of the invention will be described below with reference to FIGS. 9 and 10. A system according to this embodiment can be implemented by causing the ECU 40 to perform a control process illustrated in FIG. 10 instead of the control process illustrated in FIG. 5 using the hardware configuration illustrated in FIG. 1.

FIG. 9 is a diagram illustrating a method of detecting an air-fuel ratio of each cylinder in Embodiment 3 of the invention. The method of calculating an air-fuel ratio according to this embodiment basically employs the imbalance detecting method according to Embodiment 1. In the method according to Embodiment 1, the value of the air-fuel ratio as a reference is calculated in the process of estimating the degree of leanness of the air-fuel ratio of the reference lean cylinder. By acquiring the difference between the polytropic index m of the reference lean cylinder and the polytropic index m of another cylinder (a cylinder specified as any one of a rich cylinder and a lean cylinder) from the m-AF curve, the value of the air-fuel ratio serving as a reference in the cylinders other than the reference lean cylinder is calculated regardless of whether the corresponding cylinder is a rich cylinder or a lean cylinder. The method according to this embodiment is to detect the air-fuel ratio of each cylinder using the values of the air-fuel ratios calculated in this way, as illustrated in FIG. 9.

Figure 10:
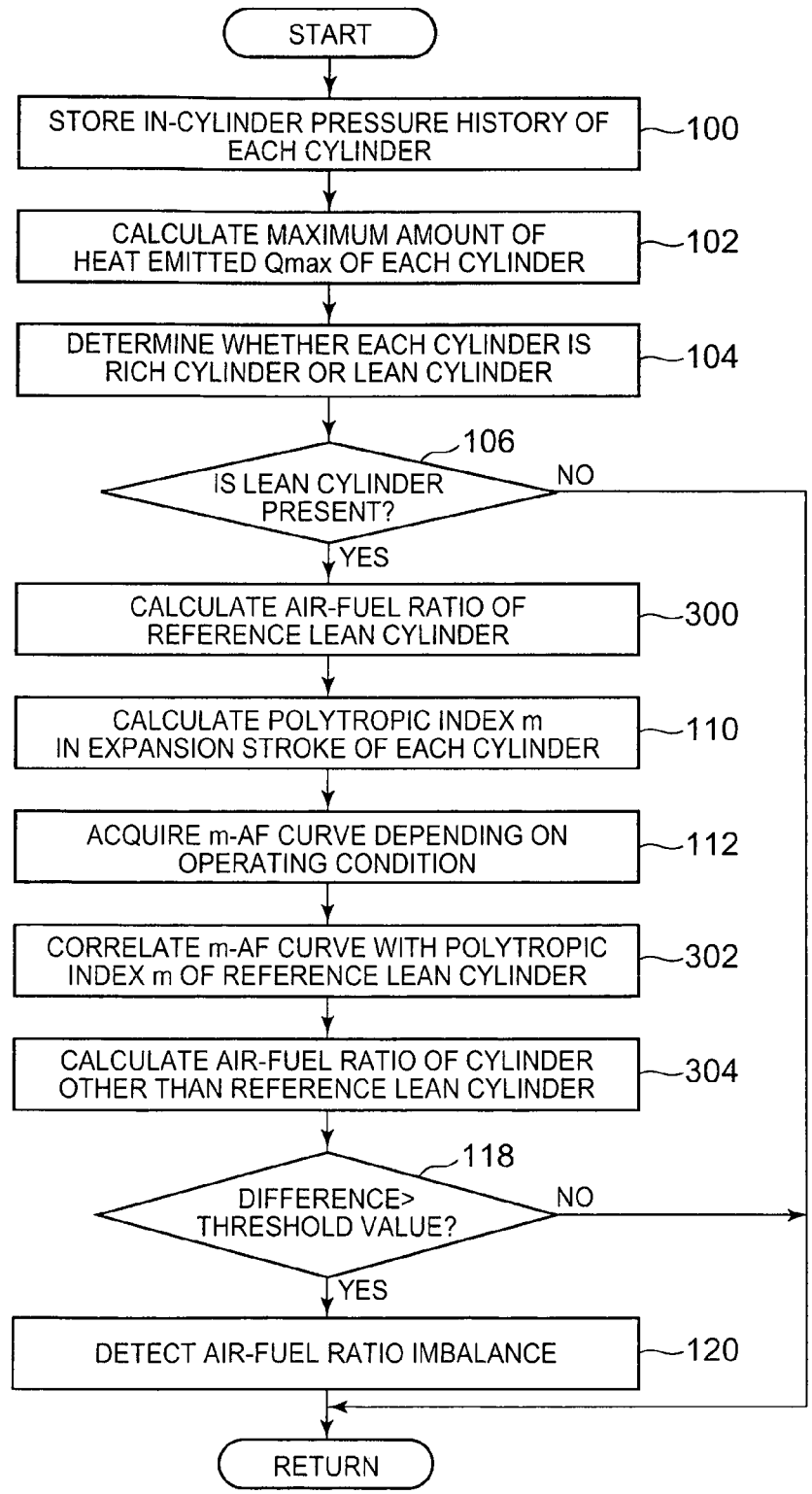
FIG. 10 is a flowchart illustrating a control process that is performed in Embodiment 3 of the invention.

FIG. 10 is a flowchart illustrating a control process that is performed by the ECU 40 so as to implement the method of detecting the air-fuel ratio of each cylinder in Embodiment 3 of the invention. In FIG. 10, the same steps as illustrated in FIG. 5 in Embodiment 1 will be referenced by the same reference numerals and description thereof will not be repeated or will be made in brief. It is assumed that this control process is started on the same condition as the control process illustrated in FIG. 5.

In the control process illustrated in FIG. 10, when it is determined in step 106 that a lean cylinder is present, the ECU 40 calculates the air-fuel ratio of the reference lean cylinder (step 300). The reference lean cylinder used in step 300 corresponds to one present lean cylinder or any one lean cylinder of plural present lean cylinders. The air-fuel ratio of the selected reference lean cylinder is calculated using the following method. That is, in step 300, a value corresponding to the air-fuel ratio obtained as a reference in the process of estimating the degree of leanness of the air-fuel ratio with respect to the theoretical air-fuel ratio through the process of step 108 in Embodiment 1 is calculated as the air-fuel ratio as the reference lean cylinder.

In the control process illustrated in FIG. 10, the ECU 40 acquires the m-AF curve depending on the current operating condition in step 112 and then performs a process of correlating the polytropic index m in an expansion stroke of the reference lean cylinder with the m-AF curve depending on the present operating condition on the basis of the polytropic index m in an expansion stroke and the air-fuel ratio of the reference lean cylinder (step 302). The specific processing details of step 302 are based on the same idea as step 118. Then, the ECU 40 calculates the air-fuel ratios of the cylinders other than the reference lean cylinder (step 304). Specifically, the air-fuel ratios of the cylinders other than the reference lean cylinder are calculated using the m-AF curve of which the position is specified on the basis of the polytropic index m and the air-fuel ratio of the reference lean cylinder and the polytropic indices m in an expansion stroke of the cylinders other than the reference lean cylinder.

In the above-mentioned control process illustrated in FIG. 10, it is possible to calculate the values of the air-fuel ratios of the cylinders using the polytropic indices m in an expansion stroke and the m-AF curve and it is thus possible to detect the air-fuel ratios of the cylinders including a rich cylinder. In the detection method according to this embodiment, even when the air-fuel ratios of all the cylinders to be evaluated in the lean-burning operation are distributed to the side higher than the theoretical air-fuel ratio, it is possible to similarly detect the air-fuel ratios of the cylinders.

In Embodiments 1 to 3, each cylinder is a rich cylinder or a lean cylinder is determined and the estimating of the degree of leanness of the air-fuel ratio of the reference lean cylinder and the calculating of the air-fuel ratio is performed, using the maximum amount of heat emitted Qmax which is calculated using the in-cylinder pressure detected by the in-cylinder pressure sensor 30. However, the combustion parameter which is calculated using the in-cylinder pressure detected by the in-cylinder pressure sensor 30 and which is used for the determination is not limited to the amount of heat emitted Q and may be, for example, a combustion rate. The combustion rate can be calculated to be higher as a main combustion period becomes shorter, for example, on the basis of the main combustion period (10%-90% combustion period) which can be calculated using a mass fraction burned (MFB). The MFB at a crank angle $\theta$ can be calculated by Expression (3) using the data of the amount of heat emitted Q in synchronization with the crank angle. Accordingly, the crank angle when the MFB is a predetermined value can be acquired using Expression (3).

$$MFB = \frac{Q(\theta) - Q(\theta_{Sta})}{Q(\theta_{fin}) - Q(\theta_{Sta})} \quad (3)$$

In Expression (3), $\theta_{sta}$ represents a combustion start point and $\theta_{fin}$ represents a combustion finish point.

Figure 11:
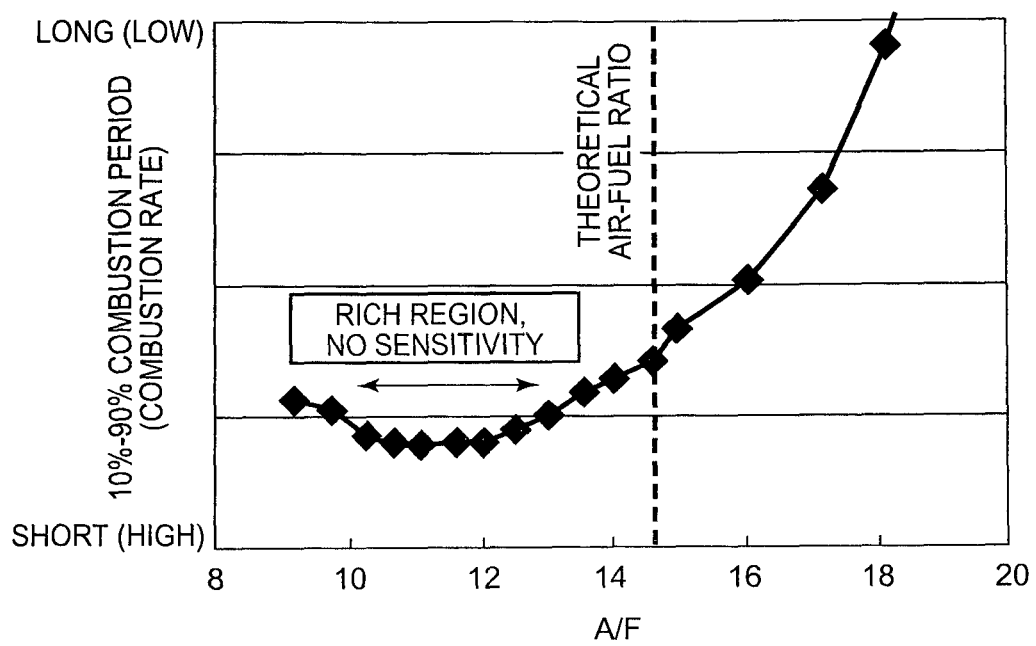
FIG. 11 is a diagram illustrating a relationship between a combustion rate and an air-fuel ratio.

FIG. 11 is a diagram illustrating the relationship between the combustion rate and the air-fuel ratio. As illustrated in FIG. 11, similarly to the amount of heat emitted Q (the maximum amount of heat emitted Qmax illustrated in FIG. 6), the combustion rate has high sensitivity to the air-fuel ratio in a region in which the air-fuel ratio is higher than the theoretical air-fuel ratio, but has low sensitivity to the air-fuel ratio due to the characteristic of a laminar flow combustion rate of fuel in a region in which the air-fuel ratio is lower than the theoretical air-fuel ratio. Accordingly, the combustion rate may be used instead of the amount of heat emitted Q (the maximum amount of heat emitted Qmax) used in Embodiment 1 or the like. More specifically, the lower the combustion rate of the reference lean cylinder becomes, the larger the degree of leanness is estimated to be.

The determination of whether each cylinder is a rich cylinder or a lean cylinder is not limited to only the use of the combustion parameter based on the in-cylinder pressure detected by the in-cylinder pressure sensor 30. That is, as the method of determining whether each cylinder is a rich cylinder or a lean cylinder, for example, by using the air-fuel ratio sensor 32, it may be estimated whether the air-fuel ratio of each cylinder is higher or lower than the theoretical air-fuel ratio in consideration of the time in which exhaust gas discharged from each cylinder reaches the air-fuel ratio sensor 32.

Embodiments 1 to 3 describe the example in which the detection for the air-fuel ratio imbalance between cylinders or the air-fuel ratio of each cylinder is performed on all the cylinders of the internal combustion engine 10. However, the evaluation of the difference in air-fuel ratio between cylinders and the evaluation of the air-fuel ratio of each cylinder in the invention are not limited to all the cylinders, but may be performed on an evaluation target cylinder group including some cylinders of the multi-cylinder internal combustion engine. Specifically, for example, in a case in which a cylinder group using one exhaust gas purifying catalyst (for example, three-way catalyst) in common includes some cylinders instead of all the cylinders, the cylinder group using the exhaust gas purifying catalyst in common may be used as the evaluation target cylinder group. Examples of this case include a case in which an exhaust gas purifying catalyst is disposed for each bank of a V-shaped engine and a case in which an exhaust gas purifying catalyst is disposed for each cylinder group in which explosion intervals are equal or substantially equal in an in-line engine.

In Embodiments 1 to 3, the m-AF curve for defining the relationship between the polytropic index m in an expansion stroke and the air-fuel ratio is used to calculate the difference in air-fuel ratio between cylinders or to calculate the air-fuel ratio. However, the air-fuel index value (corresponding to the horizontal axis in the m-AF curve illustrated in FIG. 6 or the like) used along with the polytropic index in an expansion stroke to define the relationship information in the invention is not limited to the so-called air-fuel ratio (that is, the weight ratio of the amount of air and the amount of fuel) as long as it is an index value correlated with the air-fuel ratio, and may be, for example, an excess air ratio or an equivalence ratio. When the degree of leanness of the air-fuel ratio of the reference lean cylinder is used to specify the position of the m-AF curve as described in Embodiment 1, the air-fuel ratio index value may be a value (that is, an index value indicating a degree of leanness or a degree of richness) indicating a degree of separation of the air-fuel ratio from the theoretical air-fuel ratio. An example of the index value is the difference between the maximum amount of heat emitted Qmax of a rich cylinder and the maximum amount of heat emitted Qmax of the reference lean cylinder, which is used in Embodiment 1.

In Embodiments 1 to 3, the internal combustion engine 10 using gasoline, which is an example of hydrocarbon fuel, as fuel has been exemplified. However, the fuel in the invention is not limited to the hydrocarbon fuel such as gasoline, as long as the ratios of diatomic molecules and triatomic molecules in the burnt gas vary depending on the air-fuel ratio as described in Embodiment 1, and may be, for example, hydrogen fuel.

The air-fuel ratio imbalance detecting process and the air-fuel ratio detecting process in Embodiments 1 to 3 may be performed in appropriately combinations.

What is claimed is:

1. A diagnostic system for an internal combustion engine, the internal combustion engine including a plurality of cylinders, the diagnostic system being configured to evaluate a difference in air-fuel ratio between cylinders in an evaluation target cylinder group including at least some cylinders of the plurality of cylinders, the diagnostic system comprising:

in-cylinder pressure sensors configured to detect an in-cylinder pressure in each cylinder of the evaluation target cylinder group; and an ECU configured to:
(a) determine whether each cylinder of the evaluation target cylinder group is a rich cylinder in which an air-fuel ratio is lower than a theoretical air-fuel ratio or a lean cylinder in which the air-fuel ratio is higher than the theoretical air-fuel ratio;
(b) estimate a degree of leanness of the air-fuel ratio with respect to the theoretical air-fuel ratio in at least one cylinder out of the present lean cylinders when the lean cylinders are present in the evaluation target cylinder group;
(c) calculate a polytropic index in an expansion stroke for each cylinder of the evaluation target cylinder group on the basis of the in-cylinder pressure detected by the in-cylinder pressure sensors;
(d) correlate relationship information for defining a relationship between the polytropic index in the expansion stroke and an air-fuel ratio index value with the polytropic index in the expansion stroke of a reference lean cylinder that is the lean cylinder of which the degree of leanness of the air-fuel ratio is estimated on the basis of the polytropic index in the expansion stroke and the degree of leanness of the reference lean cylinder; and
(e) calculate the difference in air-fuel ratio between cylinders on the basis of the polytropic index in the expansion stroke of the reference lean cylinder, the relationship information correlated with the polytropic index in the expansion stroke of the reference lean cylinder, and the polytropic index in the expansion stroke of the cylinder other than the reference lean cylinder in the evaluation target cylinder group.

2. The diagnostic system according to claim 1, wherein the ECU is configured to calculate an amount of heat emitted or a combustion rate in the reference lean cylinder using the in-cylinder pressure detected by the in-cylinder pressure sensors, and the ECU is configured to estimate that the degree of leanness of the air-fuel ratio of the reference lean cylinder is higher as the calculated amount of heat emitted becomes smaller or the calculated combustion rate becomes lower.

3. The diagnostic system according to claim 1, wherein the ECU is configured to determine that the air-fuel ratio is imbalanced between the cylinders when the difference in air-fuel ratio between cylinders calculated by the ECU is greater than a predetermined threshold value.

4. The diagnostic system according to claim 1, wherein the ECU is configured to calculate the polytropic index in the expansion stroke using the in-cylinder pressures at two or more points in the expansion stroke after a combustion finish point and before an opening timing of an exhaust valve and in-cylinder volumes at the two or more points in the expansion stroke.

5. A diagnostic system for an internal combustion engine, the internal combustion engine including a plurality of cylinders, the diagnostic system being configured to evaluate a difference in air-fuel ratio between cylinders in an evaluation target cylinder group including at least some cylinders of the plurality of cylinders, the diagnostic system comprising:

in-cylinder pressure sensors configured to detect an in-cylinder pressure in each of the cylinders in the evaluation target cylinder group; and an ECU configured to:
(f) determine whether each cylinder of the evaluation target cylinder group is a rich cylinder in which an air-fuel ratio is lower than a theoretical air-fuel ratio;
(g) calculate a polytropic index in an expansion stroke for each cylinder of the evaluation target cylinder group on the basis of the in-cylinder pressure detected by the in-cylinder pressure sensors; and
(h) calculate the difference in air-fuel ratio between cylinders on the basis of the polytropic index in the expansion stroke of each cylinder of the evaluation target cylinder group when all the cylinders of the evaluation target cylinder group are rich cylinders.

6. The diagnostic system according to claim 5, wherein the ECU is configured to determine that the air-fuel ratio is imbalanced between the cylinders when the difference in air-fuel ratio between cylinders calculated by the ECU is greater than a predetermined threshold value.

7. The diagnostic system according to claim 5, wherein the ECU is configured to calculate the polytropic index in the expansion stroke using the in-cylinder pressures at two or more points in the expansion stroke after a combustion finish point and before an opening timing of an exhaust valve and in-cylinder volumes at the two or more points in the expansion stroke.

8. A diagnostic system for an internal combustion engine, the internal combustion engine including a plurality of cylinders, the diagnostic system being configured to evaluate an air-fuel ratio in an evaluation target cylinder group including at least some cylinders of the plurality of cylinders, the diagnostic system comprising:

in-cylinder pressure sensors configured to detect an in-cylinder pressure in each of the cylinders in the evaluation target cylinder group; and an ECU configured to:
(i) determine whether each cylinder of the evaluation target cylinder group is a rich cylinder in which an air-fuel ratio is lower than a theoretical air-fuel ratio or a lean cylinder in which the air-fuel ratio is higher than the theoretical air-fuel ratio;
(j) calculate an air-fuel ratio index value in a present lean cylinder when the lean cylinder is present in the evaluation target cylinder group;
(k) calculate a polytropic index in an expansion stroke for each cylinder of the evaluation target cylinder group on the basis of the in-cylinder pressure detected by the in-cylinder pressure sensors;
(l) correlate relationship information for defining a relationship between the polytropic index in the expansion stroke and the air-fuel ratio index value with the polytropic index in the expansion stroke of a reference lean cylinder that is the lean cylinder of which the air-fuel ratio index value is calculated on the basis of the polytropic index in the expansion stroke and the air-fuel ratio index value of the reference lean cylinder; and
(m) calculate the air-fuel ratio index value of the cylinder other than the reference lean cylinder on the basis of the relationship information correlated with the polytropic index in the expansion stroke of the reference lean cylinder and the polytropic index in the expansion stroke of the cylinder other than the reference lean cylinder in the evaluation target cylinder group.

9. The diagnostic system according to claim 8, wherein the ECU is configured to calculate the polytropic index in the expansion stroke using the in-cylinder pressures at two or more points in the expansion stroke after a combustion finish point and before an opening timing of an exhaust valve and in-cylinder volumes at the two or more points in the expansion stroke.

* * * * *